United States Patent

[11] 3,597,663

[72] Inventor Mark Markarian
     Williamstown, Mass.
[21] Appl. No. 885,778
[22] Filed Dec. 17, 1969
[45] Patented Aug. 3, 1971
[73] Assignee Sprague Electric Company
     North Adams, Mass.

[54] ELECTROLYTIC CAPACITOR HAVING A POURED ELASTOMER O-RING SEAL
7 Claims, 6 Drawing Figs.
[52] U.S. Cl....................................................... 317/230,
     317/242, 174/50
[51] Int. Cl.................................................... H01g 1/02
[50] Field of Search........................................ 317/230,
     231, 232, 233; 312/242

Primary Examiner—James D. Kallam
Attorneys—Connolly and Hutz, Vincent H. Sweeney, James Paul O'Sullivan and David R. Thornton ABSTRACT: An electrolytic capacitor seal is formed by pouring a liquid polymerizable elastomer either on a channel at the outer edge of a capacitor cover or on a ridge formed on the inner diameter of the capacitor case and curing the elastomer so that it becomes heat resistant and resilient and in effect producing a gasket in situ upon either the cover or the capacitor case.

PATENTED AUG 3 1971 3,597,663

3,597,663

ELECTROLYTIC CAPACITOR HAVING A POURED ELASTOMER O-RING SEAL

BACKGROUND OF THE INVENTION

This invention relates to poured elastomer capacitor seals and in particular to poured elastomer gaskets utilized in sealing molded plastic covers to electrolytic capacitor cases and to a novel means for forming such seals.

Covers suitable for sealing electrolytic capacitors may be molded of thermoplastic or thermoset materials by techniques which are well known in the art such as injection molding. Plastic covers suitable for sealing electrolytic capacitors are normally molded into discs and they are fitted around their outer edge with an elastomer O-ring gasket. The capacitor case is normally rolled over the edge of the cover so as to be in intimate contact with the elastomer gasket thereby sealing the capacitor. Gaskets are normally molded, extruded or cut. Cutting gaskets from sheets involves considerable waste of material. Also the use of molded or extruded or precut gaskets requires the stocking of large inventories of different sizes required to accommodate the different diameter covers.

Therefore it is an object of this invention to produce elastomer gaskets suitable for sealing electrolytic capacitors of various sizes without the waste inherent in cutting gaskets and without stocking large inventories of different size gaskets.

SUMMARY OF THE INVENTION

A gasket suitable for sealing electrolytic capacitors is deposited upon the molded plastic cover of an electrolytic capacitor by rotating the cover, the area near the outer edge of which is molded in the form of a channel, and directing a stream of liquid polymerizable elastomer so as to fill the channel with polymerizable elastomer material while it is rotated. The cover and gasket combination are next cured to cause a cross linking of the molecules of the elastomeric material so that it becomes heat resistant and resilient, in effect producing a gasket in situ upon the cover. The cover and gasket combination are inserted at the open end of an electrolytic capacitor, the edge of which is rolled over so as to be in intimate contact with the gasket thereby sealing the capacitor. The gasket may also be poured on a ridge formed on the inside diameter of the capacitor case thereby forming an intimate bond with the cover when it is inserted.

DESCRIPTION OF THE PREFERRED EMBODIMENT

Figure 1:
FIG. 1 shows a sectional view of a molded plastic cover having a molded terminal hole and a molded channel near its outer rim, the cover being suitable for sealing electrolytic capacitors.
Figure 2:
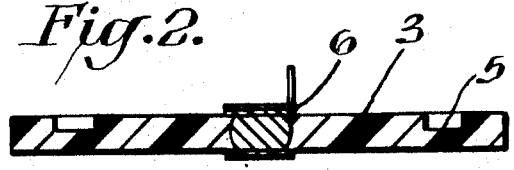
FIG. 2 shows the cover of FIG. 1 after the terminal is inserted.

FIG. 1 shows a cross-sectional view of a standard molded disc-shaped cover 3 normally used for sealing electrolytic capacitors. The cover is molded from a suitable thermoplastic or thermoset material by such well-known and conventional techniques as injection molding, compression molding or casting. The molded cover would incorporate molded hole 4 in order to facilitate the insertion of a conducting terminal 6 as shown in FIG. 2.

Figure 3:
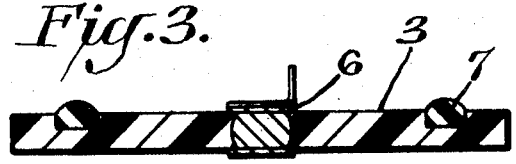
FIG. 3 shows the cover of FIG. 2 after an elastomer gasket has been poured in the molded channel.
Figure 4:
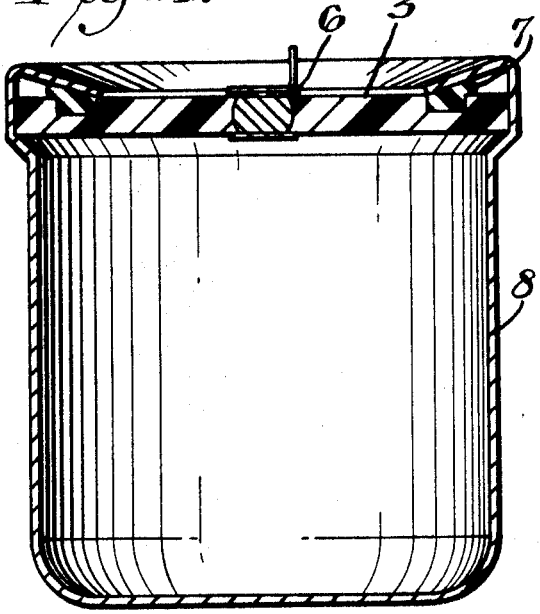
FIG. 4 shows the cover of FIG. 3 sealing a typical electrolytic capacitor case, the edge of which has been rolled over so as to compress the elastomer gasket.

The area near the outer edge of cover 3 is molded in the form of a channel 5 into which a stream of liquid polymerizable elastomer 7 is poured as shown in FIG. 3. The cover would normally be rotated as the stream of liquid polymerizable elastomer is poured into the channel. The covers would next be cured to cause a cross linking of the bonds of the elastomeric material thereby making it heat resistant and resilient and in effect producing a gasket in situ upon the cover. Cover 3 would then be inserted at the open end of an electrolytic capacitor case 8 and the edge of the capacitor case rolled over so as to come into intimate contact with elastomer ring 7 thereby sealing the end of the capacitor case as shown in FIG. 4. Terminal 6 may be connected to either the anode or cathode section of the capacitor by any well-known connecting means such as a flexible folding conducting foil.

Most elastomeric materials are suitable for pouring in the above-described manner and the following is a list of elastomers both natural and synthetic which may be satisfactorily utilized for sealing electrolytic capacitors: acrylic rubber, butyl rubber, butadiene rubber, depolymerized rubber, ethylene-propylene rubber, natural rubber, nitrile rubber, isoprene rubber, sulfide rubber, styrene butadiene rubber, silicone rubber and urethane rubber. Also copolymers of the above-mentioned elastomers may be satisfactorily poured so as to form suitable gaskets. The above-mentioned elastomers may be poured as either hot melts or solvent solutions. Hot melts which solidify at average room temperatures can be formulated without vulcanizing agents, thereby forming elastomeric gaskets which perform satisfactorily under normal environmental conditions. Elastomers formulated as solvent solutions may have vulcanizing agents added so as to withstand higher environmental temperatures. The elastomeric in situ gaskets are normally vulcanized after pouring by passing the covers through curing ovens. Vulcanizing temperatures must be compatible with the distortion temperatures of the plastic covers so as not to deform the covers during the curing process. Covers of thermoset material may employ gaskets vulcanized at higher temperatures due to the higher distortion temperatures of thermoset materials. Antioxidants which prolong the life of the elastomer may be added either to the hot melt or solvent solution. Also reinforcing fillers which reduce the cost of the poured gaskets may be added. Accelerators may also be added to increase the rate of vulcanization and permit the vulcanization to be carried out rapidly at a lower temperature. Accelerators are of particular advantage when pouring into thermoplastic covers because they permit elastomer gaskets to be vulcanized at temperatures below the distortion temperatures of thermoplastic covers.

One synthetic elastomer particularly well suited for pouring in the above-described manner is silicone rubber. Silicone rubber is advantageous because it remains flexible and serviceable at temperatures as low as −130° F. and as high as 500° F. It combines good resistance to weathering, moisture and corrosive atmospheres with resistance to electrical and mechanical fatigue. Also room temperature vulcanizing silicone rubbers (RTV types) are available with the added advantage of being compatible for use with either thermoplastic or thermoset covers without risk of exceeding the distortion temperatures of the covers. Most RTV silicone rubbers are designed to cure through the addition of a catalyst, however, new RTV silicone rubbers are available which may simply be poured and they will not sag or slump and will cure in place through contact with atmospheric moisture.

Other synthetic elastomers highly suited for pouring in the above-described manner are butadiene-acrylonitrile copolymers or nitrile-type synthetic rubbers which may be compounded, processed and vulcanized by practically the same methods as natural rubber. These rubbers are generally less thermoplastic than natural rubber and therefore they require softeners to improve the freeze resistance, resilience and extensibility of the nitrile-type synthetic rubbers. The compounded butadiene-acrylonitrile copolymers are remarkable for their resistance to aging, cold, heat and the swelling action of oils, greases and solvents. The high resistance to solvents of nitrile-type synthetic rubber seals permits the cleaning of excess soldering fluxes from capacitors with cleaning solvents without risk of the cleaning agent permeating through the seal and contaminating the electrolyte.

Figure 5:
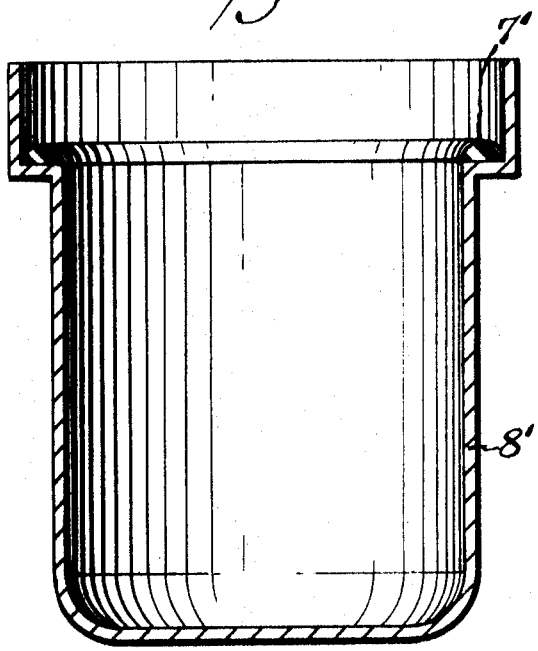
FIG. 5 shows a cross-sectional view of a typical electrolytic capacitor case having a ridge along its inner diameter upon which an elastomer gasket is poured.
Figure 6:
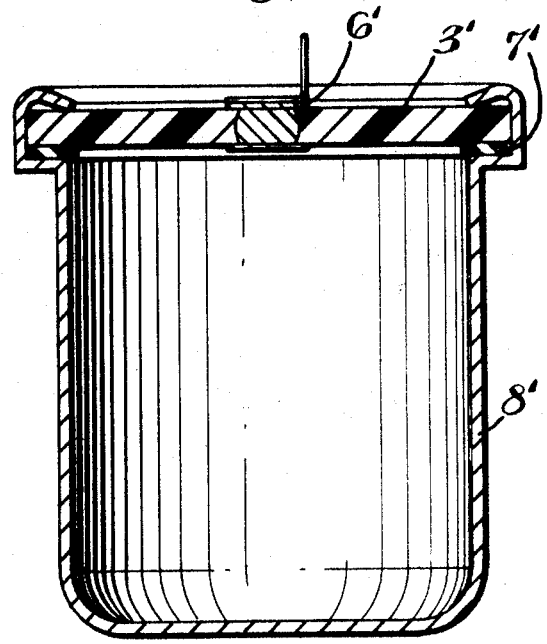
FIG. 6 shows the capacitor case of FIG. 5 sealed by a molded plastic cover, the outer edge of which is in intimate contact with the poured gasket.

FIG. 5 which is a sectional view of a typical metal capacitor case shows an alternate embodiment of the present invention. The top of the capacitor case is drawn so as to form a ridge around its inner diameter. A stream of liquid polymerizable elastomer is poured onto the top of the ridge as the capacitor case is rotated depositing an elastomer O-ring 7' on the inner ridge of capacitor case 8'. The case would then be heated, as previously discussed in reference to the poured cover, so as to cause a cross linking of the bonds of the elastomeric material thereby making the elastomer heat resistant and in effect producing a gasket in situ upon the capacitor case ridge. One advantage to pouring the liquid polymerizable elastomer on a ridge formed in the metal capacitor case is that the elastomer can be vulcanized at higher temperatures without damage to the capacitor case. After the elastomer is cured, a cover 3' preferably molded of a thermoset or thermoplastic material in the above-described manner with terminal 6' through its center, is inserted from the open end of capacitor case 8' and rests on the elastomer gasket 7' as shown in FIG. 6. The outer edge of capacitor case 8' is then rolled over so as to squeeze the rim of the cover against elastomer gasket 7' thereby sealing the capacitor.

Capacitors sealed by two poured elastomer gaskets can be produced by using the two previously disclosed embodiments in combination. The first gasket is poured on the ridge formed around the inside surface of the capacitor case near its open end. The second gasket is poured in the molded channel near the outside edge of the plastic cover. The cover is then inserted at the open end of the capacitor case so that the side of the cover opposite the molded channel, is supported by the gasket overlaying the ridge around the inside of the case. The outside edge of the capacitor cover is then rolled over to be in intimate contact with the poured gasket in the molded channel of the cover. Rolling the edge of the capacitor case squeezes both elastomer gaskets between the cover and case, thereby effectively sealing the end of the capacitor with two poured elastomer gaskets.

What I claim is:

1. A sealed electrolytic capacitor case comprising: a metal cylindrical case having at least one open end, a molded plastic cover of substantially disc shape having at least one conducting terminal passing therethrough, said cover having an outer diameter substantially the same as the inner diameter of the open end of said case and positioned within the open end of said case so as to have its center axis in the same line as the center axis of said case; and a poured resilient elastomer O-ring gasket one side of which is in intimate contact with the surface area of and near the outside edge of one side of said cover, and the other side of which is in intimate contact with the inside circumferential surface area of said case substantially near its open end and forming a seal between said cover and the open end of said case.

2. The sealed capacitor case of claim 1 wherein: said cover contains a circumferential channel molded on one side of said cover substantially near the outer edge of said cover; said poured elastomer O-ring gasket substantially fills and protrudes from said channel; and the outer edge at the open end of said capacitor case being rolled over into intimate contact with that part of said elastomer gasket that protrudes from said channel thereby forming said seal in the open end of said capacitor case.

3. The sealed capacitor case of claim 1 wherein: said case has a circumferential ridge along its inner diameter; and said poured elastomer O-ring gasket overlays said ridge and is in intimate contact with the surface area around the outside edge of said cover which is firmly pressed against said gasket thereby forming said seal in the open end of said capacitor case.

4. The sealed capacitor case of claim 3 wherein the outside edge at the open end of said case is rolled over into intimate contact with outside surface of said cover presses the inside surface area around the edge of said cover firmly against said gasket.

5. The gasket of claim 1 wherein said elastomer is natural rubber.

6. The gasket of claim 1 wherein said elastomer is synthetic rubber.

7. The gasket of claim 6 wherein said elastomer is selected from the group consisting of acrylic rubber, butyl rubber, butadiene rubber, depolymerized rubber, ethylene-propylene rubber, nitrile rubber, isoprene rubber, sulfide rubber, styrene butadiene rubber, silicone rubber and urethane rubber.